United States Statutory Invention Registration [19]

[11] Reg. Number: H278

Steiner [43] Published: Jun. 2, 1987

[54] APPARATUS FOR ADAPTING A RIFLE TO FIRE A DIFFERENT PROJECTILE

[75] Inventor: James Steiner, Bridgewater, N.J.

[73] Assignee: The United States of America as represented by the Secretary of the Army, Washington, D.C.

[21] Appl. No.: 751,101

[22] Filed: Jul. 2, 1985

[51] Int. Cl.[4] ..... F41C 21/18

[52] U.S. Cl. ..... 42/77; 42/78; 89/14.05

*Primary Examiner*—Charles T. Jordan
*Assistant Examiner*—Ted L. Parr
*Attorney, Agent, or Firm*—Anthony T. Lane; Harold H. Card, Jr.; Michael C. Sachs

[57] ABSTRACT

An adaptor for attachment to the end of a rifle allows an individual to fire from the rifle a different projectile than originally designed for the rifle, without substantial degredation in overall accuracy and throw distance of the rifle. The adaptor has a rifled cylinder which in the typical application will have progressive twist rifling. The tangential force acting upon the projectile within the progressive twist rifling area has a semi-elliptical shape and an exit value of approximately zero. An adaptor ring and outer shell are preferably employed to mount the rifled cylinder to the rifle and for aligning the adaptor axis and rifling with the rifle barrel axis and rifling.

19 Claims, 10 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

APPARATUS FOR ADAPTING A RIFLE TO FIRE A DIFFERENT PROJECTILE

GOVERNMENTAL RIGHTS

The invention described herein may be manufactured, used and licensed by or for the Government for Governmental purposes without the payment to me of any royalties thereon.

BACKGROUND OF THE INVENTION

1. Technical Field

The present invention relates in general to rifles and more particularly to apparatus for adapting a rifle to fire a projectile of different design than the rifle was manufactured to fire.

2. Background Information

Presently, the basic United States Army infantry rifle is the M-16 and the cartridge designed to be fired from this rifle is the M-193. At the time of the present invention, NATO, through its various technical panels and study commissions, was conducting a technical evaluation program to determine the best cartridge to be used in connection with its new Infantry Rifle Standardization Agreement. Among the candidates for selection was the Belgium SS-109 cartridge. Certain logistical and technical problems would have arised for the United States infantry if the SS-109 projectile had been selected as the desirable cartridge for the standardization effort. Although the Belgium SS-109 and the U.S. M-193 share basically the same physical envelope, the projectile designs are sufficiently different that the SS-109 requires a higher spin rate to achieve gyroscopic stability than the M-193. If the Belgium SS-109 is fired from the standard U.S. M-16 rifle, problems of reduced effectiveness at normal firing temperatures and total instability at reduced air temperatures occur, thus compromising the rifle's usefulness.

Should the Belgium SS-109 cartridge have been chosen for the NATO infantry standardization effort then prompt cooperation by the United States Government would have meant replacing all existing M-16 rifles with barrels having rifling characteristics like those of a Belgian rifle designed to fire the SS-109 cartridge, or designing an adaptor which could be field installed to provide the additional spin rate needed to stablize the SS-109 projectile fired from the U.S. M-16. The present is the result of extensive research involving this latter option.

Previous attempts to design a similar adaptor for attachment to the end of a rifle have generally failed. These attempts have been unsuccessful in maintaining gyroscopic stability of the projectile upon its exit from the adaptor, primarily because of continued projectile angular acceleration after the projectile has exited from the adaptor, an inherent result of the approach taken by these prior attempts. Projectile angular acceleration after the projectile has exited from the adaptor will cause the projectile to yaw or oscillate, thus reducing the overall effectiveness of the weapon. This projectile angular acceleration results from the prior art use of an exponential function to progressively change the rifle twist rate.

Therefore, there exists a genuine need for an effective, inexpensive adaptor for attachment to the end of a rifle which will allow an individual to fire from the rifle a projectile, different than the projectile originally designed for the rifle, without substantial degradation in the overall accuracy and throw distance of the rifle.

SUMMARY OF THE INVENTION

Briefly, the present invention satisfies this need by providing a spin amplifying adaptor for attachment to the end of the rifle; the adaptor being uniquely designed to substantially eliminate projectile angular acceleration after the projectile has exited the adaptor. The adaptor includes a rifled cylinder which in the preferred implementation will have progressive twist rifling. As a result of this progressive twist rifling there will be a tangential force acting upon the projectile within the rifled cylinder. In the preferred embodiment of the present invention, this tangential force will have a semi-elliptical shape when plotted against distance along the rifled cylinder axis, with an entrance and exit value of approximately zero. The progressive twist rifling which will result in this tangential force has an instantaneous twist rate which is a function of the longitudinal location of the projectile within the rifled cylinder, the initial and final twist rates within the rifled cylinder, and the length of the progressive twist rifling area within the rifled cylinder. The projectile will be stabilized at a desired increased angular velocity upon exiting from the adaptor due to the approximately zero tangential force acting upon it just prior to exiting from the rifled cylinder.

The preferred structural embodiment of the present invention includes a rifled cylinder having the above described progressive twist rifling and eccentric inner and outer surfaces. Also provided is an outer shell having a specially designed bore at one end for receiving the rifled cylinder, and a second, shorter bore, at its opposite end, for receiving an adaptor ring. These two bores in the outer shell are designed to be axially offset and longitudinally spaced from each other. The adaptor ring will have a threaded inner surface for easy attachment to a rifle barrel which is ordinarily threaded on the end for receiving a flash suppressor. The adaptor ring will ordinarily have eccentric inner and outer surfaces. The eccentricities, although slight, provide a sufficient degree of freedom to properly align the adaptor axis and rifling with the rifle barrel axis and rifling. This freedom of alignment is useful in accommodating the variations that result from the standard practice of manufacturing rifle barrels within certain measurable tolerances. The adaptor may be locked onto the rifle barrel by placing a lock nut on the rifle barrel threads before attaching the adaptor ring. Set screws, used to secure the rifled cylinder, outer shell and adaptor ring in a fixed relation, may be inserted through threaded holes in the outer shell to engage circumferentially cut grooves in the rifled cylinder and adaptor ring. Optional threads may be included on the outer surface of a part of the rifled cylinder projecting from the outer shell, for accommodating a flash suppressor.

A primary object of the present invention is the provision of an adaptor for attachment to the end of a rifle which will allow an individual to fire from the rifle a projectile, different than the projectile originally designed for the rifle, without substantial degradation in the overall accuracy and throw distance of the rifle.

Another object of the present invention is the provision of an adaptor for attachment to the end of a rifle barrel which will provide spin amplification and gyroscopic stability to a projectile not originally designed to be fired from the rifle.

Yet another object of the present invention is the provision of a rifle adaptor having progressive twist rifling yet zero exit projectile angular acceleration.

A further object of the present invention is the provision of such a rifle adaptor capable of attachment to the end of different rifle barrels manufactured within certain measurable parameters.

A still further object of the present invention is the provision of a relatively inexpensive and easy to construct rifle adaptor which can be easily installed by an individual.

Still another object of the present invention is the provision of a rifle adaptor capable of accommodating a flash suppressor on the end thereof.

Yet another object of the present invention is the provision of an adaptor for attachment to the end of a standard United States infantry M-16 rifle which will allow a Belgium SS-109 cartridge to be fired therefrom without substantial degradation in rifle performance.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE INVENTION

Figure 1:
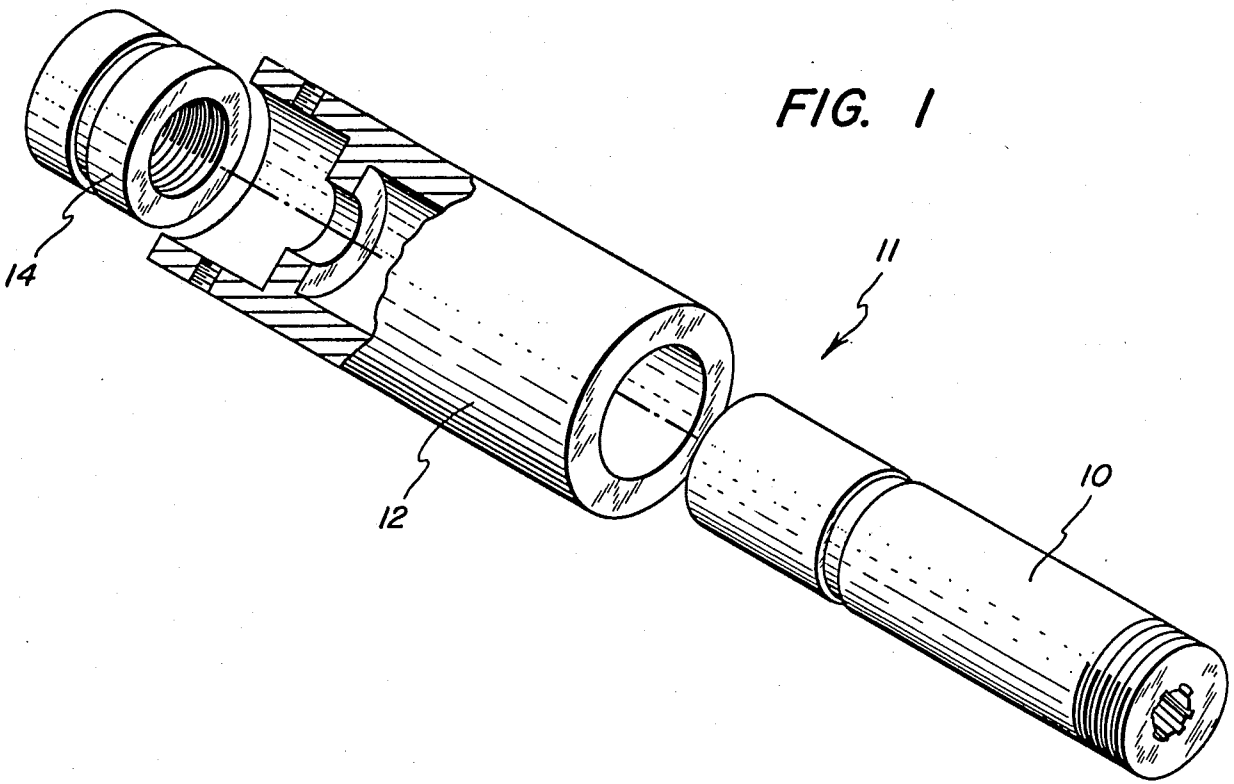
FIG. 1 is an exploded, perspective view of the present invention showing the principal components of its preferred structural embodiment.

The principal components of the preferred embodiment of the present invention, a rifled cylinder 10, an outer shell 12, and an adaptor ring 14, all of which are discussed in detail below, are shown in an exploded view in FIG. 1.

A typical application of the present invention would be the use of the adaptor to provide gyroscopic stability to a projectile that is longer than originally designed to be fired from a certain rifle. Gyroscopic stability of such a projectile may be obtained by increasing the angular velocity of the projectile. Structurally central to accomplishing this goal of the present invention is the rifled cylinder 10, shown in a lengthwise, cross-sectional view in FIG. 2. Generally, the rifled cylinder 10 may be rifled in such a way as to provide an increase, or decrease, in angular velocity function. For the application described above, the rifled cylinder 10 will function to increase the angular velocity of the projectile when the rifled cylinder 10 is manufactured to have a progressive twist rifling area of length L on its inner surface 22. By selectively increasing the rifling twist rate, it is possible to obtain a desired angular velocity for any given projectile. As a result of this progressive twist rifling area a tangential force is applied to the projectile in such a way as to increase the angular velocity of the projectile.

The adaptor of the present invention accomplishes the above described basic function of increasing projectile angular velocity while at the same time substantially eliminating projectile angular acceleration after the projectile has exited from the rifled cylinder 10. This is accomplished by designing the rifled cylinder 10 in such a way that there is substantially no tangential force acting upon the projectile just prior to its exiting the adaptor. As noted earlier, projectile angular acceleration subsequent to the projectile exiting the adaptor causes the projectile to yaw or oscillate, reducing the overall effectiveness of the weapon. The elimination of projectile angular acceleration from the projectile exiting from the adaptor has resulted in the present invention being the only rifle adaptor known to the inventor, which is capable of maintaining the gyroscopic stability of a projectile fired from a rifle not originally designed to fire it through a wide temperature range.

Several mathematical functions were examined in the search for the optimal tangential force equation upon which to pattern the progressive twist rifling within the rifled cylinder 10. In choosing a desirable tangential force function it was also necessary to consider the desirability of providing a substantially zero tangential force acting upon the projectile at the entrance to the rifled cylinder 10. By slightly delaying the application of a tangential force to the projectile within the rifled cylinder 10, it was possible to provide a smoother transition for the projectile 17 from the rifle barrel 16 (see FIG. 5) to the rifled cylinder 10.

The preferred embodiment of the present invention is a semi-elliptically-shaped tangential force equation having a value approximately zero at both ends of the progressive twist rifling area. An elliptical expression for the tangential force was chosen for its workability and ultimate efficiency when applied within the rifled cylinder 10, although, at least theoretically, other mathematical functions which have a value of approximately zero at each end and sufficient non-zero value therebetween might be employed. After selection of a semi-elliptically-shaped tangential force equation it was possible to express the maximum force that the projectile would experience within the progressive twist rifling area as follows:

$$F_{MAX} \approx 4 \cdot \frac{I_{xx} \cdot V^2}{D \cdot L} \cdot \frac{[N_I - N_F]}{[N_I \cdot N_F]} \qquad \text{(Equation 1)}$$

In this equation, $I_{xx}$ is a shorthand representation for the axial projectile moment of inertia, V is the longitudinal velocity of the projectile within the rifled cylinder, D is the projectile diameter, L is the length of the progressive twist rifling area of the rifled cylinder 10, $N_I$ is the rifling twist rate at the entrance to the rifled cylinder and $N_F$ is the rifling twist rate at the exit of the rifled cylinder. It will be observed that for a given implementation of the present invention, $I_{xx}$, V, D, $N_I$, and $N_F$ are all independently determinable quantities.

As noted in Equation 1, the maximum tangential force applied to the projectile within the progressive twist rifling area is inversely proportional to the length L of the progressive twist rifling area. Through independent stress analysis it is possible to determine the maximum tangential force that a projectile can withstand. The length L of the gain twist rifling area may then be determined through the utilization of Equation 1 and the selection of an appropriate peak tangential force (i.e. a value below the maximum tangential force the projectile can sustain). Note that the higher tangential force that a projectile can withstand the shorter the progressive twist rifling area length L is required.

An expression of the instantaneous rifling twist rate within the progressive twist rifling area may be obtained by successively integrating the tangential force equation, Equation 1, as is well known in the art. The instantaneous rifling twist rate within the progressive twist rifling area may then be expressed as the following:

$$N = \frac{\pi N_I \cdot N_F L}{\pi N_F L + 4 \cdot (N_I - N_F)\left[\frac{\left(X - \frac{L}{2}\right)}{2} \cdot \left(1 - \frac{4}{L^2} \cdot \left(X - \frac{L}{2}\right)^2\right)^{\frac{1}{2}} + \frac{L}{4}\left\{ASIN\left(\frac{2X}{L} - 1\right) + \frac{\pi}{2}\right\}\right]} \quad \text{(Equation 2)}$$

The new variables in this second equation are N, the instantaneous rifling twist rate; X, projectile travel distance within the progressive twist rifling area; and ASIN, the inverse sine. From Equation 2 it is possible to calculate and plot the rifling generation within the rifled cylinder 10 for the length of the progressive twist rifling area L. This is accomplished by arbitrarily selecting a number of datum points, that is, values for X, and then calculating the instantaneous rifling twist rate N for those locations.

By way of an example, rifling characteristics of an adaptor designed for attachment to the end of the U.S. M-16 rifle in order that a Belgian SS-109 cartridge may be satisfactorily fired therefrom, will be set forth. The Belgian SS-109 cartridge is slightly longer than the standard U.S. M-16 rifle cartridge, the M-193. As noted earlier, firing a longer projectile than originally designed to be fired from the rifle will require an adaptor to step up the angular velocity of the longer projectile, which in turn is accomplished through the appropriate progressive twist rifling within the adaptor.

Referring to Equation 1, it is possible to independently determine the quantities $I_{xx}$, V, and D for the Belgian SS-109 cartridge. Also, the initial and final rifling twist rates, $N_I$ and $N_F$, for the adaptor are obtainable. The U.S. M-16 rifle has a known barrel rifling twist rate of one turn in twelve inches. This value must be the same as the entrance rifling twist rate, $N_I$, in order to facilitate transition of the projectile 17 from the rifle barrel 16 to the rifled cylinder 10 of the adaptor 11, see FIG. 5. It is also known that in order to maintain gyroscopic stability of the Belgian SS-109 cartridge, the cartridge must exit from a rifle having a twist rate of one turn in seven inches. Thus, $N_F$ must be one turn in seven inches. Substituting known values into Equation 1 it is possible to reduce the equation to an inverse relationship between the maximum tangential force, $F_{MAX}$ and the length of the progressive twist rifling, L.

Figure 3:
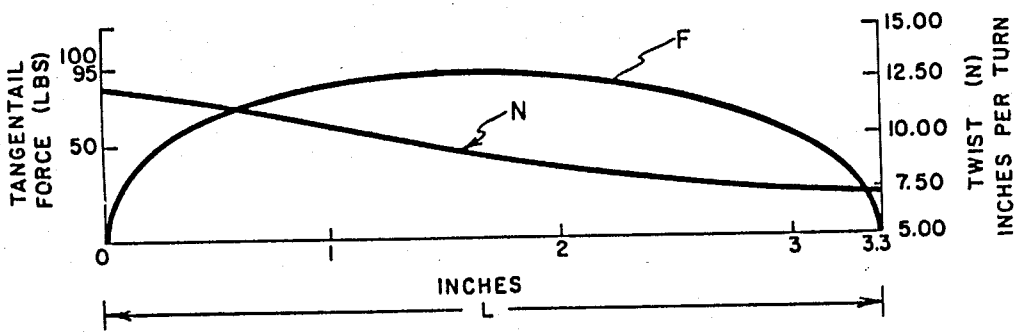
FIG. 3 is a graph of the typical loading caused by the adaptor, showing the force, in pounds, acting upon the projectile and the twist rate of the projectile, in inches per turn, within the progressive twist rifling area of the rifled cylinder.
Figure 4:
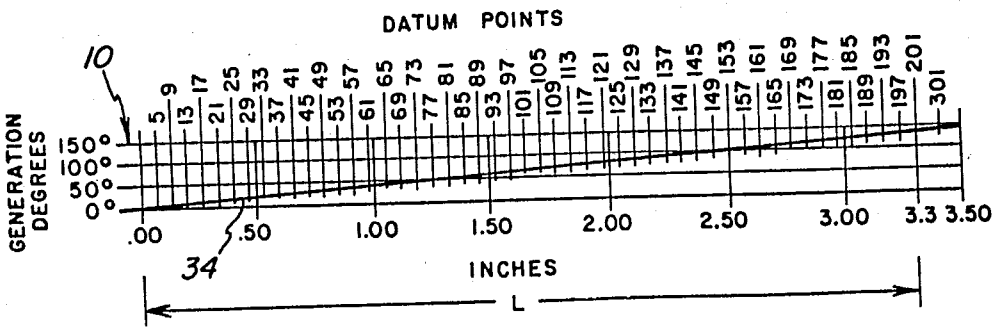
FIG. 4 is a representation of one rifling groove within the rifled cylinder showing the generation in degrees within the progressive twist rifling area of the rifled cylinder.

Through independent measurements, the maximum tangential force that the Belgian SS-109 cartridge is able to withstand may be determined. This maximum tangential force value has been determined to be approximately 120 pounds. After selection of a peak tangential force to be applied to the Belgian SS-109 cartridge within the adaptor, preferably some value less than the 120 pound maximum tangential force the Belgian SS-109 cartridge is able to withstand, it is possible to determine the length L of the progressive twist rifling area. For a peak tangential force of 95 pounds it is determined that the progressive twist rifling length L would be 3.3 inches, see FIG. 3. The instantaneous rifling twist rate N may then be obtained by substitution of this value for L into Equation 2. The resulting instantaneous twist rate N is plotted in FIG. 3. From the second equation it is also possible to calculate and plot the rifling generation within the progressive twist rifling area in degrees, by selecting certain arbitrary datum points for X, see FIG. 4.

Figure 2:
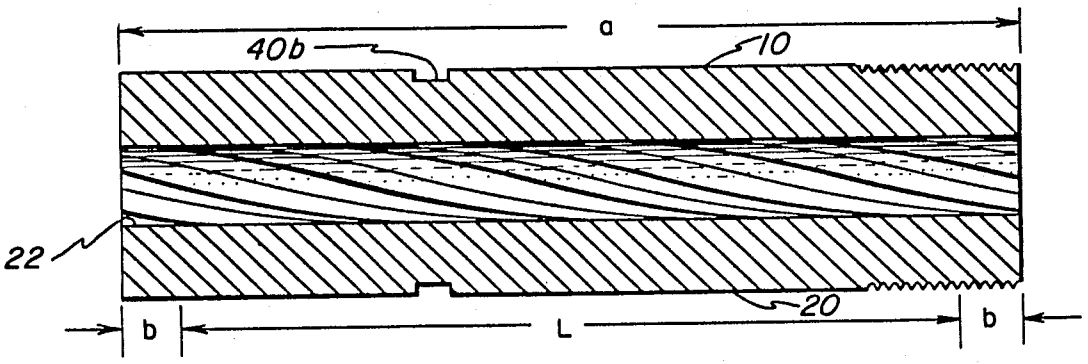
FIG. 2 is a lengthwise cross-sectional view of the rifled cylinder of the present invention and FIG. 2A is an end view of the rifled cylinder.

The preferred structural embodiment of the present invention has three main elements. The first and central element is the rifled cylinder 10. The rifled cylinder 10 has an outer surface 20 and a rifled inner surface 22 as shown in FIG. 2. The rifled character of inner surface 22 is more clearly shown in FIG. 2A, having lands 28 and grooves 30. This rifling which is produced according to known techniques, preferably implements Equation 2 discussed above.

Figure 2A:
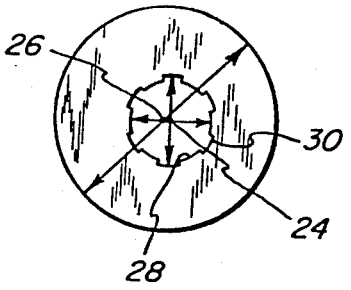

Also shown in FIG. 2A is the eccentricity of inner surface 22 and outer surface 20, the inner surface having an axis 24 and the outer surface having an axis 26 spaced therefrom. This slight eccentricity is one of three structural eccentricities which are utilized to provide a sufficient degree of freedom to properly align the adaptor axis and rifling with the rifle barrel axis and rifling. Also shown in FIG. 2 is a circumferentially cut groove **40*b* within which set screws 36*b* attach to maintain the rifled insert 10 and an outer shell 12, discussed below, in a fixed relation, see FIG. 5**.

Figure 6A:
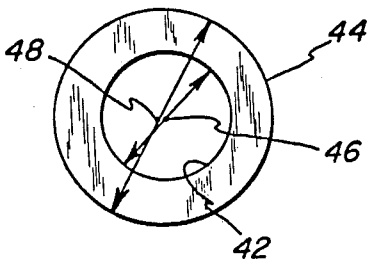
FIG. 6A is an end view of the adaptor ring.
Figure 6:
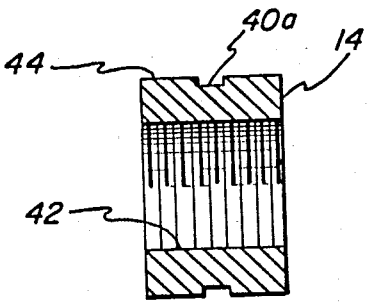
FIG. 6 is a lengthwise cross sectional view of the adaptor ring.

The second element of the preferred structural embodiment of the present invention is the adaptor ring 14 shown in a longitudinal, cross-sectional view in FIG. 6. The adaptor ring 14 has an outer surface 44 and an inner surface 42. The inner surface 42 is threaded so that the adaptor ring can be connected to a rifle barrel 16 having threads on the end thereof. The adaptor ring 14 also has eccentric inner and outer surfaces as can be seen in FIG. 6A. The inner surface 42 has an axis 46 and the outer surface 44 has an axis 48 slightly offset therefrom. The adaptor ring 14 also has a circumferentially cut groove **40*a* similar in design and purpose to the circumferentially cut groove 40*b* in the rifled cylinder 10**.

Figure 7A:
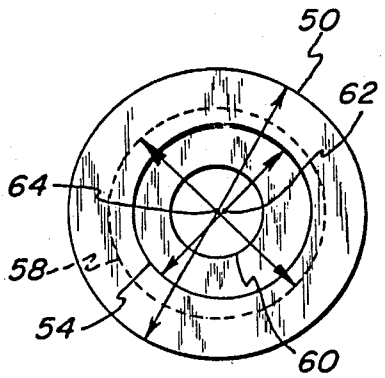
FIG. 7A is an end view of the outer shell, shown from the end designed to receive the rifled cylinder.
Figure 7:
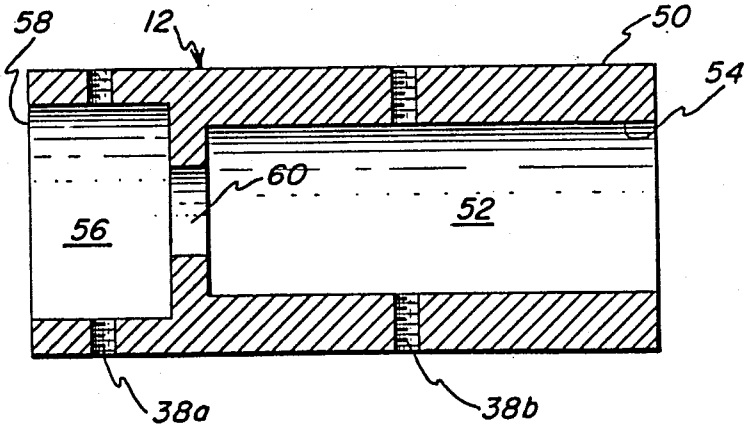
FIG. 7 is a lengthwise cross-sectional view of the outer shell.

The third major element of the preferred embodiment, the outer shell 12, is shown in FIG. 7. The outer shell 12 has a first bore 52 on one end thereof for receiving the rifled cylinder 10. And a second, shorter inner bore 56 on the opposite end thereof for receiving the adaptor ring 14. The two inner bores 52 and 56 are designed to be axially offset and longitudinally spaced from each other. As a result of this, the third and last eccentricity employed to provide a sufficient degree of freedom to properly align the adaptor axis and rifling with the rifle barrel axis and rifling is obtained.

The outer shell 12 has an outer surface 50, an inner surface 54, associated with the first inner bore 52, and a second inner surface 58 associated with the second inner bore 56. The eccentricity or axial offset of bores 52 and 56 can be more readily seen in FIG. 7A where the axis 62 for the first inner bore 52 is shown slightly offset from the axis 64 for the second inner bore 56. The two bores 52 and 56 in the outer shell 12 are separated by a projecting portion 60. This projecting portion 60 is sufficiently recessed so that the projectile 17 will not come in contact with it, as can be noted from FIG. 5. The projection 60 mainly serves to provide structural integrity for the adaptor 11. Also shown in FIG. 7 are threaded receiving holes 38*a* and 38*b*, through which set screws 36*a* and 36*b* are placed to engageably contact circumferentially cut grooves 40*a* and 40*b*, respectively.

Figure 5:
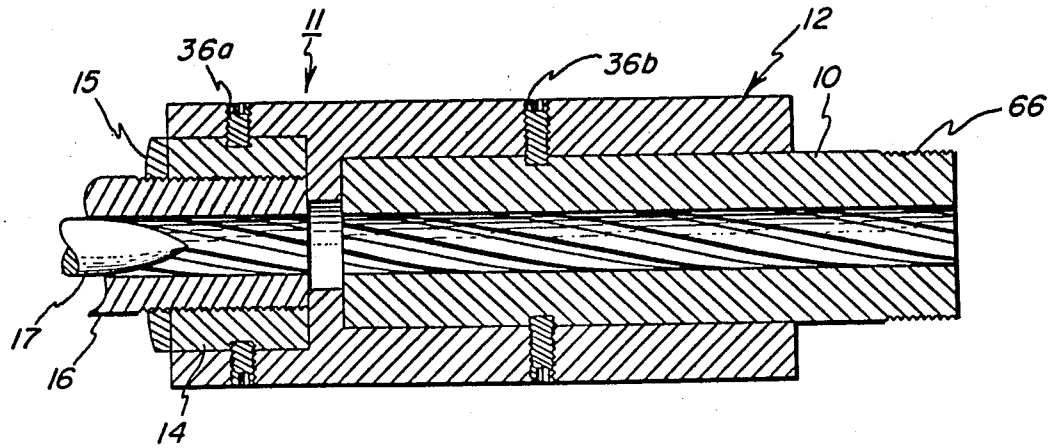
FIG. 5 is a lengthwise cross-sectional view of the assembled adaptor attached to the end of the rifle barrel.

As generally illustrated in FIG. 5, the adaptor 11 may be assembled by first placing the rifled cylinder 10 within the first inner bore 52 of the outer shell 12, and secondly, by placing the adaptor ring 14 in the second inner bore 56 of the outer shell 12. The three elements may then be connected to the rifle of the barrel by threading the adaptor ring 14 onto the existing threads on the end of the rifle barrel 16. In the preferred embodiment a lock nut 15 will first be placed on the rifle barrel threads and be used to lock the adaptor assembly in place in relation to the rifle barrel.

The axis and rifling of the rifled cylinder 10 will then be aligned with the axis and rifling of the rifle barrel 16. Exact alignment is made possible as a result of the above discussed three eccentricities. The rifled cylinder 10 will be rotated in relation to the outer shell 12 and, after optimal alignment is obtained, fixed in position through utilization of set screws 36*b*. Next, the rifled cylinder and outer shell assembly are rotated in relation to the adaptor ring 14, obtaining a further refinement of the axial and rifle alignment. This rifled cylinder and outer shell assembly is then fixed in relation to the adaptor ring 14 through utilization of set screws 36*a*. Exact axial and rifle alignment is then obtained by rotation of the adaptor apparatus on the threads on the end of the rifle barrel. Once final alignment is obtained, the lock nut 15 is moved in position to securely affix the adaptor assembly 11 in relation to the rifle barrel 16.

Also shown in FIG. 5 are threads 66 on the outer surface 20 of the rifled insert 10, for accommodating a flash suppressor (not shown).

Returning to the earlier example, it will be remembered that the progressive twist rifling area had a length L of 3.3 inches. In the preferred embodiment of the present invention an additional increment "*b*", e.g. 0.2 inches, is added on each side of L to obtain a total length "*a*" of the rifled cylinder 10, as shown in FIG. 2. The additional length "*b*", although arbitrary, is of sufficient length so as to allow the projectile 17 to smoothly make the transitions at the entrance and exit of the rifled cylinder 10.

Lastly, it should be noted that each of the eccentricities above discussed would be approximately 0.02 inches in the case of an adaptor designed for attachment to the end of a U.S. M-16 rifle. This eccentricity is based upon the manufacturing parameters for the barrel of an M-16 rifle.

It will be noted that this invention fully meets the objectives set forth. A rifle adaptor is provided for attachment to the end of a rifle barrel which will provide gyroscopic stability to a projectile not originally designed to be fired from the rifle. Also, it will be noted that the adaptor imparts a substantially zero entrance and exit projectile angular acceleration and has a sufficient value therebetween to provide the required angular velocity such that the projectile is able to maintain gyroscopic stability. Additionally, it is evident that the three-element assembly of the present invention provides a sufficient degree of freedom to allow an individual to accurately align the adaptor axis and rifling with the rifle barrel axis and rifling. Lastly, it will be observed that the adaptor is relatively inexpensive and easy to construct, can be easily installed by an individual, accommodates a flash suppressor and is particularly well suited for adapting an M-16 rifle to fire SS-109 cartridges.

Although one embodiment has been illustrated in the accompanying drawing and described in the foregoing description, it will be understood that the invention is not limited to the embodiment discussed but is capable of numerous rearrangements, modifications, and substitutions without departing from the scope of the invention. For example, the mathematical function chosen to represent the tangential force within the progressive twist rifling area may have been a sine function or other function which has a value approximately zero at both ends and provides the desired spin modification. Also, it will be observed that the three-piece preferred structural embodiment of the present invention is only preferable, not necessary. It would also be possible to manufacture the adaptor of the present invention in one piece. Other changes, within the scope of the invention as defined by the appended claims, will suggest themselves to those skilled in this art.

I claim:

1. Apparatus for adapting a rifle to fire a projectile of different design than the rifle was manufactured to fire, comprising:

first means for modifying the spin rate of a projectile fired from the rifle to provide gyroscopic stability to said projectile after it exits said first means, the angular acceleration of the projectile as it exits said first means being substantially the same as the angular acceleration of the projectile as it enters said first means.

2. The apparatus of claim 1, further comprising:

second means for attaching the first means to the end of the rifle.

3. The apparatus of claim 2 wherein the first means comprises:

means for increasing the spin rate of the projectile fired from the rifle.

4. The apparatus of claim 3, wherein the first means comprises:

means for applying a tangential force to the projectile within the first means, the tangential force applied to the projectile at the entrance and exit of the first means being approximately zero.

5. The apparatus of claim 4, wherein the tangential force has a semi-elliptically-shaped profile.

6. The apparatus of claim 4, wherein the means for applying the tangential force comprises:

rifling having a twist rate which is a function of the longitudinal location of the projectile within the first means.

7. The apparatus of claim 6, wherein the means for applying the tangential force comprises:

a rifled cylinder having inner surface progressive twist rifling, said rifling having a twist rate which is a function of the longitudinal location of the projectile therein, the initial and final twist rates, and the length of the rifled cylinder.

8. The apparatus of claim 7, wherein the rifling twist rate is in accordance with the following equation:

$$N = \frac{\pi N_I \cdot N_F L}{\pi N_F L + 4 \cdot (N_I - N_F)\left[\frac{\left(X - \frac{L}{2}\right)}{2} \cdot \left(1 - \frac{4}{L^2} \cdot \left(X - \frac{L}{2}\right)^2\right)^{\frac{1}{2}} + \frac{L}{4}\left\{ASIN\left(\frac{2X}{L} - 1\right) + \frac{\pi}{2}\right\}\right]}$$

where

N=twist rate (inches/turn)

$N_I$=initial twist rate entering the rifled cylinder $N_F$=final twist rate leaving the rifled cylinder X=projectile travel distance within the progressive twist rifling area L=length of the progressive twist rifling area of the rifled cylinder ASIN=inverse sine

9. The apparatus of claim 8, wherein the rifle barrel has a barrel axis and exit rifling and wherein the second means comprises:

means attaching the first means to the barrel of the rifle such that the barrel axis will be substantially aligned with an axis of the first means and the barrel exit rifling will be substantially aligned with entrance rifling of the first means.

10. The apparatus of claim 9 for attachment to a rifle having an outer threaded surface at the end of the rifle barrel, wherein the rifled cylinder has eccentric inner and outer surfaces and wherein the second means comprises:

an adaptor ring, annular in shape having a threaded inner surface for engaging the outer threaded barrel surface and an outer surface eccentric to the threaded inner surface;

an outer shell having: a first inner bore designed to engagably receive the rifled cylinder therein, a second inner bore eccentric to the first inner bore and axially spaced therefrom, said inner bore being configured to engagably receive the adaptor ring therein, and an outer surface concentric with the second inner bore;

said rifled cylinder, adaptor ring and outer shell being selectively rotatable relative to each other and to the barrel for alignment purposes; and means for maintaining the adaptor ring, outer shell and rifled cylinder in a fixed position relative to one another and relative to the rifle barrel after proper alignment of the apparatus with the rifle barrel.

11. The apparatus of claim 10 wherein the maintaining means comprises:

a lock nut first placed on the threaded outer surface of the barrel for securing the adaptor ring in position relative to the outer surface of the barrel; and set screws inserted through threaded holes in the outer shell and engaging two shallow grooves, one groove being cut circumferentially in the outer surface of the adaptor ring, the other groove being cut circumferentially in the outer surface of the rifled cylinder, for securing the adaptor ring, outer shell, and rifled cylinder in position relative to one another.

12. The apparatus of claim 11 wherein the rifled cylinder has an end which extends longitudinally beyond the outer shell, said cylinder end having an outer threaded surface for attachment of a flash suppressor.

13. The apparatus of claim 12, wherein the rifle comprises a US M-16 rifle, the projectile comprises a Belgium SS-109 bullet, and wherein the rifling twist rate at the entrance to the rifled cylinder is one turn in twelve inches and at the exit of the rifled cylinder is one turn in seven inches.

14. The apparatus of claim 2, wherein the first means comprises:

a rifled cylinder having eccentric inner and outer surfaces and inner surface rifling.

15. The apparatus of claim 14, wherein the rifle barrel has a barrel axis and exit rifling and wherein the second means comprises:

means attaching the first means to the barrel of the rifle such that the barrel axis will be substantially aligned with an axis of the first means and the barrel exit rifling will be substantially aligned with entrance rifling of the first means.

16. The apparatus of claim 15 for attachment to a rifle having an outer threaded surface at the end of the rifle barrel, wherein the second means comprises:

an adaptor ring, annular in shape having a threaded inner surface for engaging the outer threaded barrel surface and an outer surface eccentric to the threaded inner surface;

an outer shell having a first inner bore designed to engagably receive the adaptor ring therein, a second inner bore eccentric to the first inner bore and axially spaced therefrom, said second inner bore being configured to engagably receive the first means therein, and an outer surface concentric with the first inner bore;

said rifled cylinder, adaptor ring and outer shell being selectively rotatable relative to each other and to the barrel for alignment purposes; and means for maintaining the adaptor ring, outer shell and rifled cylinder in a fixed position relative to one another and relative to the rifle barrel after proper alignment of the apparatus with the rifle barrel.

17. The apparatus of claim 16 wherein the maintaining means comprises:

a lock nut first placed on the threaded outer surface of the barrel for securing the adaptor ring in position relative to the outer surface of the barrel; and set screws inserted through threaded holes in the outer shell and engaging two shallow grooves, one groove being cut circumferentially in the outer surface of the adaptor ring, the other groove being cut circumferentially in the outer surface of the rifled cylinder, for securing the adaptor ring, outer shell, and rifled cylinder in position relative to one another.

18. The apparatus of claim 17 wherein the rifled cylinder has an end which extends longitudinally beyond the outer shell, said cylinder end having an outer threaded surface for attachment of a flash suppressor.

19. The apparatus of claim 18, wherein the rifle comprises a US M-16 rifle, the projectile comprises a Belgium SS-109 bullet and wherein the rifling twist rate at the entrance to the rifled cylinder is one turn in twelve inches and at the exit of the rifled cylinder is one turn in seven inches.

* * * * *